(12) United States Patent  
Oboodi et al.

(10) Patent No.: US 7,260,994 B2
(45) Date of Patent: Aug. 28, 2007

(54) LOW COST HIGH-PRESSURE SENSOR

(75) Inventors: Reza Oboodi, Morris Plains, NJ (US); James Piascik, Randolph, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/266,708

(22) Filed: Nov. 3, 2005

(65) Prior Publication Data

US 2007/0095144 A1   May 3, 2007

(51) Int. Cl.
*G01L 9/06* (2006.01)
(52) U.S. Cl. .................. 73/721; 73/727; 361/283.1
(58) Field of Classification Search .............. 73/721, 73/727; 361/283.1
See application file for complete search history.

(56) References Cited

U.S. PATENT DOCUMENTS

| 4,207,604 | A | * | 6/1980 | Bell ........................ 361/283.4 |
| 4,388,668 | A | * | 6/1983 | Bell et al. ................. 361/283.4 |
| 4,426,673 | A | * | 1/1984 | Bell et al. ................. 361/283.4 |
| 4,445,385 | A |   | 5/1984 | Endo ............................ 73/726 |
| 4,986,861 | A |   | 1/1991 | Nishida et al. ............... 156/89 |
| 5,872,315 | A |   | 2/1999 | Nagase et al. ................ 73/726 |
| 6,877,380 | B2 |  | 4/2005 | Lewis ........................... 73/715 |

* cited by examiner

*Primary Examiner*—Andre J. Allen
(74) *Attorney, Agent, or Firm*—Roberts & Roberts

(57) ABSTRACT

A pressure sensing apparatus including a thin disc of a metal having a ceramic material layer and piezoresistive elements formed thereon. A surface of the disc is bonded to a diaphragm assembly on a pressure port base constructed of a low cost metal. The bonding process is performed at low temperatures, (<700° C.), so that the diaphragm assembly and pressure port do not require high temperature corrosion resistance, and can thus be formed of less expensive materials. The inventive apparatus provides a lower cost alternative to conventional high pressure sensors since less material is used, less expensive materials are used, and fabrication is less complex. The inventive apparatus is also more reliable and exhibits greater thermal stability than conventional high pressure sensors.

28 Claims, 3 Drawing Sheets

LOW COST HIGH-PRESSURE SENSOR

BACKGROUND OF THE INVENTION

1. Field of the Invention

The invention relates to pressure sensors. In particular, it relates to high pressure sensors having increased reliability, thermal stability and adhesion properties, while being inexpensive to fabricate.

2. Description of the Related Art

For years, those skilled in the art have made continuous efforts to develop pressure sensors that are low in cost and capable of being mass produced, while exhibiting high reliability, sensitivity and linearity. Certain-conventionally known pressure sensors have been known to include semiconductor materials with a micromachined sensing diaphragm. In the processing of such structures, a thin diaphragm is often formed in a silicon wafer through chemical etching. Ion implantation and diffusion techniques are then used to drive doping elements into the diaphragm, forming piezoresistive elements whose electrical conductivity changes with strain, such that deflection or deformation of the diaphragm causes a change in resistance value of the piezoresistive element. These changes correspond to the magnitude of pressure applied to the diaphragm. However, silicon is susceptible to chemical attack and erosion, particularly in environments such as where a high-pressure medium is to be sensed, such as automotive applications that involve sensing pressures of brake fluid, oil, coolant, transmission fluid, hydraulic fluid, fuel, or steering fluid, at pressures of two atmospheres or more. For such applications, a pressure sensor must be physically resilient, and resistant to the hostile environment of a sensed medium.

Presently used methods for producing media-compatible sensors include enclosing a silicon sensing chip in an inert fluid, such as a silicone oil or gel, and then further separating the sensing chip from a medium to be sensed with a metal diaphragm, such that pressure must be transmitted through the metal diaphragm and the fluid to the sensing chip. Unfortunately, the manufacturing processes for these sensors are expensive and complex. As a result, these sensors are unsuitable for mass production.

Another known process involves the formation of a capacitor plate on a ceramic diaphragm, which is then bonded to a base with a second capacitor plate. The use of a chemically-resistant and mechanically-tough ceramic materials, such as aluminum oxide or zirconium oxide, allow the diaphragm to directly contact the medium whose pressure is to be measured. As the ceramic diaphragm deforms or deflects under the influence of pressure, the space between the capacitor plates changes, thereby causing a change in capacitance that corresponds to the applied pressure. However, the circuits required to detect such capacitance changes are often complex and subject to noise corruption. Furthermore, attaining an adequate seal between the ceramic diaphragm and the base for high pressure applications is often difficult.

Yet another known approach involves the use of a chemically resistant ceramic diaphragm having thick-film piezoresistors screen-printed thereon. As with ceramic capacitive pressure sensors, the ceramic material allows direct contact with the medium whose pressure is to be sensed, eliminating the need for protective packaging. However, while the signal detection circuitry may be less complicated, it is difficult to reliably seal the ceramic diaphragm with a base.

Further, it is known in the art to employ a metal diaphragm as the sensing element. Because metal diaphragms generally deform more for a given thickness and pressure than ceramic diaphragms, which exhibit lower elongations before breaking and are therefore designed to deform less under pressure, sensing is performed by thin-film polysilicon resistors. The metal diaphragm is first coated with a thin-film layer of typically silicon dioxide or silicon nitride to electrically insulate the diaphragm from thin-film resistors and their conductors. A thin-film polysilicon layer is then deposited on the insulating layer by chemical vapor deposition (CVD), and then etched through a mask formed by spinning a liquid photoresistive material onto the polysilicon layer. The photoresistive material is exposed and developed to obtain the pattern required for the resistors, and thin-film conductors are then formed by evaporation. However, the equipment necessary to deposit the insulating and polysilicon layers is expensive, and deposition rates are extremely slow. Deposition of the thin-film layers requires multiple patterning, exposure, developing and stripping steps for the required thin-film spun-on photoresists and metallization, and must be carried out in a controlled environment to avoid surface defects. In addition, such processes typically deposit thin-films no thicker than about 10,000 angstroms, requiring the surface of the metal diaphragm to be extremely smooth to avoid defects.

Metal diaphragm sensors have also been produced with thick-film metal oxide resistors. A thick-film oxide layer is formed by printing and firing a thick-film ink, after which a thick-film metal oxide layer is printed and fired on the insulating layer to form resistors. Thick-film conductors are typically employed with this type of sensor. However, since thick film materials fire at very high temperatures, for example in the range of 800° C. to 1000° C. and above, the diaphragm must then be formed of a metal having excellent high temperature corrosion resistance. While several high temperature resistant specialty metals are known in the art, they are very expensive and difficult to machine. Another option is to attach a small metal diaphragm "button" of specialty metal to a pressure port base made of a cheaper material. However, these structures are often unreliable at higher pressures.

Clearly, a need for further improvement exists in the art of pressure sensors, particularly in the formation of pressure sensors which are lower in cost to produce, while still being reliable at high pressures. The present invention provides a solution to this problem. The invention provides a pressure sensing apparatus which includes a thin disc of a specialty metal or ceramic, having a ceramic material layer and piezoresistive elements formed thereon. This structure is bonded to a diaphragm assembly on a pressure port base constructed of a low cost metal. The bonding process is performed at low temperatures, (<700° C.), so that the diaphragm assembly and pressure port do not require high temperature corrosion resistance, and can thus be formed of less expensive materials.

The inventive pressure sensing apparatus provides a lower cost alternative to conventional high pressure sensors since less material is used, less expensive materials are used, and fabrication is less complex. The inventive apparatus is also more reliable and exhibits greater thermal stability than conventional high pressure sensors.

SUMMARY OF THE INVENTION

The invention provides a pressure sensing apparatus which comprises:

a) a pressure port having an upper surface and a base portion;

b) an elastically deformable pressure-sensitive diaphragm assembly having upper and lower surfaces and a central pressure-sensitive diaphragm; the lower surface of the diaphragm assembly being attached onto the upper surface of the pressure port;
c) a substantially planar disc having upper and lower surfaces; the lower surface of the disc being bonded to the upper surface of the diaphragm assembly via a layer of a bonding material;
d) a ceramic material layer on the upper surface of the disc; and
e) a plurality of piezoresistive elements on the ceramic material layer.

The present invention further provides a method for forming a pressure sensing apparatus which comprises:
a) providing a substantially planar disc having upper and lower surfaces;
b) forming a ceramic material layer on the upper surface of the disc;
c) forming a plurality of piezoresistive elements on the ceramic material layer;
d) providing a pressure port having an upper surface and a base portion;
e) attaching a deformable pressure-sensitive diaphragm assembly, having upper and lower surfaces and a central pressure-sensitive diaphragm, onto the pressure port such that the lower surface of the diaphragm assembly is attached onto the upper surface of the pressure port; and
f) bonding the lower surface of the disc to the upper surface of the diaphragm assembly.

The present invention still further provides a method for sensing pressure, which comprises:
I) providing a pressure sensing apparatus comprising:
  a) a pressure port having an upper surface and a base portion;
  b) an elastically deformable pressure-sensitive diaphragm assembly having upper and lower surfaces and a central pressure-sensitive diaphragm; the lower surface of the diaphragm assembly being attached onto the upper surface of the pressure port;
  c) a substantially planar disc having upper and lower surfaces; the lower surface of the disc being bonded to the upper surface of the diaphragm assembly via a layer of a bonding material;
  d) a ceramic material layer on the upper surface of the disc; and
  e) a plurality of piezoresistive elements on the ceramic material layer;
II) placing the pressure sensing apparatus into a pressurized environment, thereby causing the diaphragm to deform in response to changes in pressure;
III) detecting any changes in pressure of the pressurized environment via the piezoresistive elements; and
IV) analyzing the pressure of the pressurized environment by observing changes in the piezoresistive elements.

DETAILED DESCRIPTION OF THE INVENTION

The invention provides a pressure sensing apparatus for use in various pressure environments and which performs particularly well in very high pressure environments.

Figure 1:
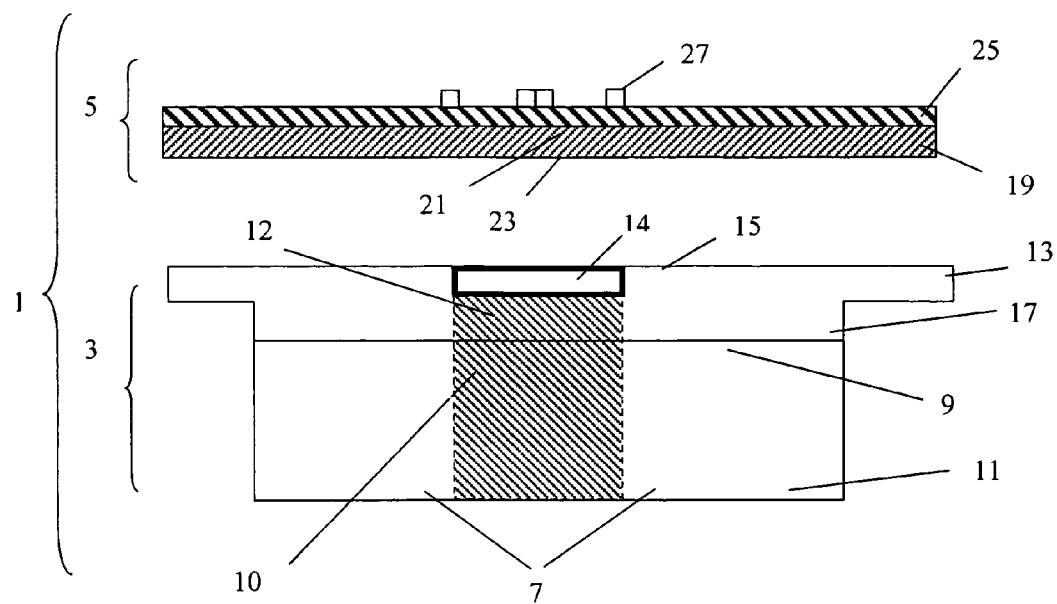
FIG. 1 shows a schematic side-view of a sensing component and a base component, of which the inventive pressure sensing apparatus is formed.
Figure 2:
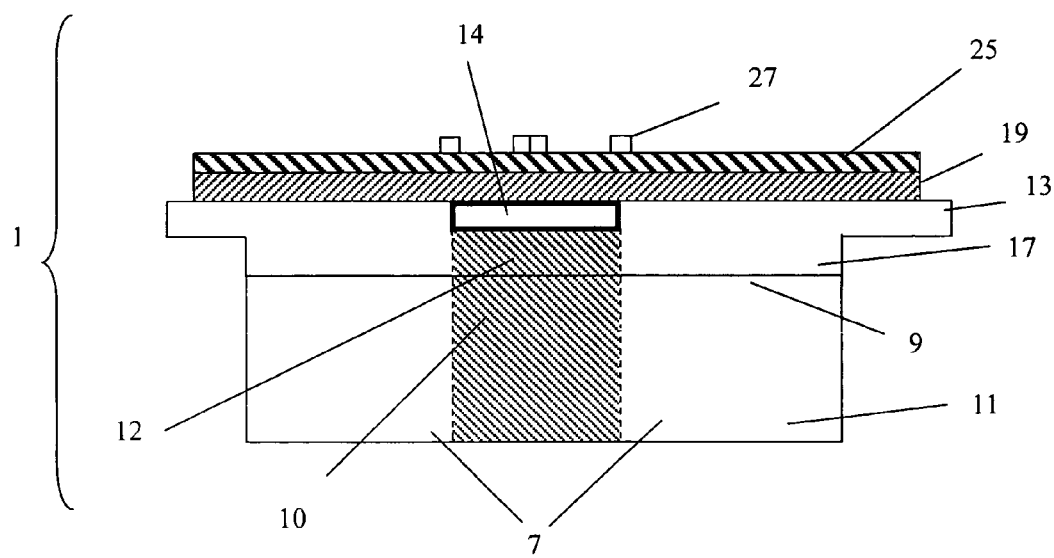
FIG. 2 shows a schematic side view of a pressure sensing apparatus of the invention.
Figure 3:
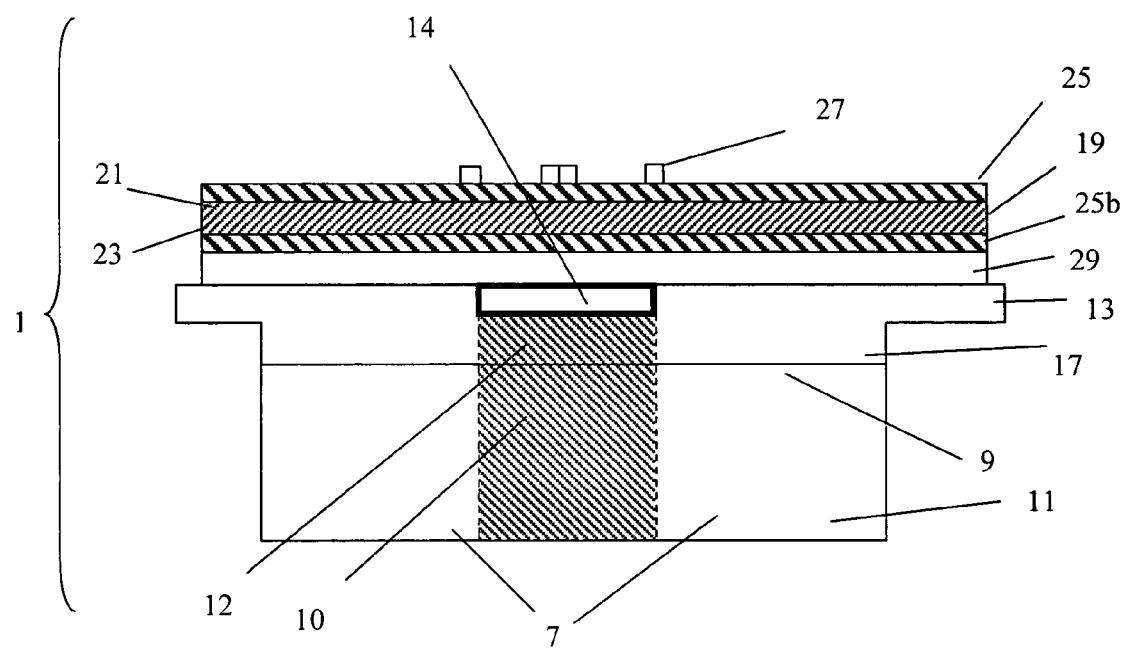
FIG. 3 shows a schematic side view of a pressure sensing apparatus of the invention having an additional ceramic material layer.

As the FIGS. 1-3 show, the inventive pressure sensing apparatus 1, includes two main components, namely a sensing component 5, and a base component 3. As shown in FIG. 1, the base component 3 comprises a pressure-sensitive diaphragm assembly 13 attached onto a pressure port 7. The pressure port 7 includes an upper surface 9 and a base portion 11 surrounding a central inlet 10. Such pressure ports are known in the art, and serve to connect the sensor to pressure media. Typical pressure ports are cylindrical in shape, and range from about ¼ inch (6.35 mm) to about 1 inch (25.4 mm) in diameter, and from about ½ inch (12.7 mm) to 1.5 inches (38.1 mm) in height. The pressure port's cylindrical base typically includes connection threads around an outer surface of its base portion, for threadably attaching the pressure port to other devices. Such threads typically range from about ¼ inch (6.35 mm) to about 9/16 inch (14.29 mm) in thickness. The pressure port preferably further includes a hexagonally threaded portion around the outer surface of its base portion, to allow for tightening the pressure port with a wrench. The pressure port may comprise a variety of materials known in the art of pressure port formation, such as metals including stainless steel, specialty stainless steels, superalloys and the like.

FIGS. 1 and 2 further show a pressure-sensitive diaphragm assembly 13 attached onto the pressure port 7. The diaphragm assembly 13 preferably comprises a substantially flat, substantially circular upper surface 15, a pressure-sensitive diaphragm 14, and a lower surface 17 having a central inlet 12. This lower surface 17 of the diaphragm assembly 13 is to be attached onto the upper surface 9 of the pressure port 7. The diaphragm assembly 13 and the pressure port 7 are preferably attached via welding or the like.

Such diaphragm assemblies are typically formed by machining a flat metal disc. The resulting diaphragm assembly 13 includes a diaphragm 14, preferably centrally located at an upper surface 15 of the diaphragm assembly 13, and a protruding lower surface 17 at a bottom of the assembly 13. The protruding lower surface 17 typically comprises an annular ring or the like having a central inlet 12. When attached to a pressure port 7 having a central inlet 10, it is preferred that the pressure port's central inlet 10 corresponds with the diaphragm assembly's central inlet 12 such that pressures exerted on the pressure port 7 and the diaphragm assembly 13 are indicated by deformations of the diaphragm 14.

The diaphragm assembly 13, including the diaphragm 14 is preferably elastically deformable, and is capable of deforming in response to, and correspondingly with, changes in pressure of the medium or environment to be sensed. The diaphragm assembly 13 may comprise a variety of materials such as metals, ceramics, and the like. Factors such as performance, cost, operating environment, and specific customer needs will dictate material selection. In one preferred embodiment, the diaphragm assembly 13 comprises a low cost metal or metal alloy. Suitable materials for the diaphragm assembly nonexclusively include stainless steel, nickel, or combinations and/or alloys thereof. Preferred diaphragm assembly materials nonexclusively include common stainless steels, such as 300- and 400-series stainless steels and the like; precipitation-hardened stainless steels such as 17-4PH, 15-5PH, 13-8PH and the like; and superalloys. Superalloys are specialty alloy materials known in the art which include a high nickel content and exhibit desirable properties such as high strength, high temperature resistance, oxidation resistance, and the like. Examples of superalloys include Inconel™ materials, Hastelloy™ materials and Haynes™ materials, which are commercially available.

The diaphragm 14 preferably has a substantially consistent thickness throughout, such that its thickness is substantially the same at its center and its edges. Size and shape characteristics of the diaphragm 14 will depend on environmental factors and be determined by those skilled in the art, since the diaphragm's geometry, thickness, and diameter will determine the usable pressure range of the overall pressure sensor. For example, for use in a high pressure environment, the thickness of the diaphragm is increased and its diameter is decreased. For lower pressure environments, the thickness of the diaphragm is decreased and its diameter is increased. Preferably the diaphragm 14 has a thickness ranging from about 0.025 mm to about 4.5 mm, more preferably from about 0.051 mm to about 1.83 mm, and most preferably from about 0.076 mm to about 0.91 mm. Preferably the diaphragm 14 has a diameter ranging from about 0.3 mm to about 30 mm or more, more preferably from about 0.51 mm to about 1.83 mm, and most preferably about 0.76 mm to about 0.91 mm.

The diameter of the diaphragm assembly 13 will vary, depending on the diameter of the diaphragm 14. That is, the diameter of the diaphragm assembly 13 must be at least equal to the diameter of the diaphragm 14. Preferably the ratio of the entire diaphragm assembly's diameter to diaphragm's diameter ranges from about 1.1:1 to about 5:1.

Furthermore, it is preferred that, in those embodiments wherein the lower surface 15 of the diaphragm assembly 13 comprises an annular ring or the like, the wall thickness of the annular ring or the like is greater than or equal to the thickness of the diaphragm 14.

The invention further comprises a sensing component 5, which is to be attached to the base component 3 via the upper surface 15 of the diaphragm assembly 13. It is preferred that at least a portion of the sensing component 5 is attached onto a surface of the diaphragm 14. The sensing component 5 first comprises a substantially planar disc 19 having upper and lower surfaces, 21 and 23 respectively. The substantially planar disc 19, which preferably comprises a metal or ceramic material, should have a substantially similar coefficient of thermal expansion as the material of the diaphragm assembly 13 as described above, to thereby minimize stress caused by differential expansion of the diaphragm 14 and the disc 19. Again, factors such as performance, cost, operating environment, and specific customer needs will dictate material selection. Some suitable materials for the substantially planar disc 19 nonexclusively include metals such as stainless steel, nickel, aluminum, or combinations and/or alloys thereof; ceramics such as alumina, zirconia, silica, and combinations thereof. Preferred disc materials nonexclusively include common stainless steels such as 300- and 400-series stainless steels and the like; precipitation-hardened stainless steels such as 17-4PH, 15-5PH, 13-8PH and the like; superalloys such as Inconel™ materials, Hastelloy™ materials and Haynes™ materials, which are commercially available; and oxidation-resistant aluminum-containing alloys such as Haynes 214™, FeCr alloys, 18SR stainless and the like; and combinations and/or alloys thereof.

The disc 19 preferably has a thickness ranging from about 0.025 mm to about 1.5 mm, more preferably from about 0.025 mm to about 0.75 mm, and most preferably from about 0.040 mm to about 0.75 mm. The disc 19 preferably has a diameter ranging from about 0.3 mm to about 30 mm or more, more preferably from about 1.6 mm to about 25 mm, and most preferably from about 6.4 mm to about 12.7 mm.

Figure 4A:
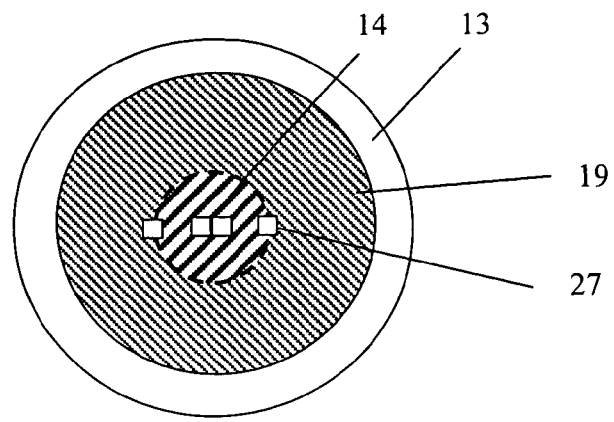
FIGS. 4a-4c show top views of various disc configurations according to the present invention.
Figure 4B:
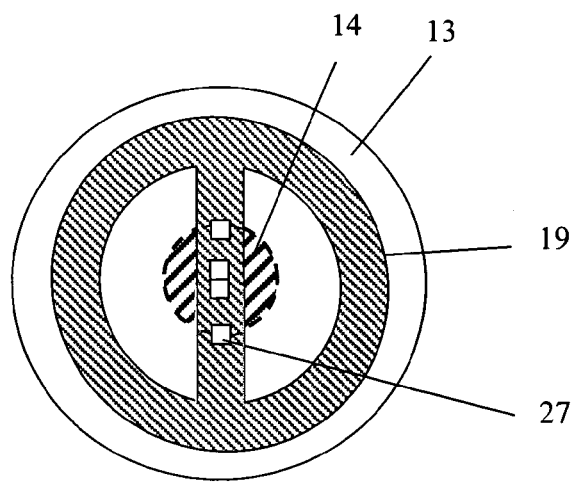
Figure 4C:
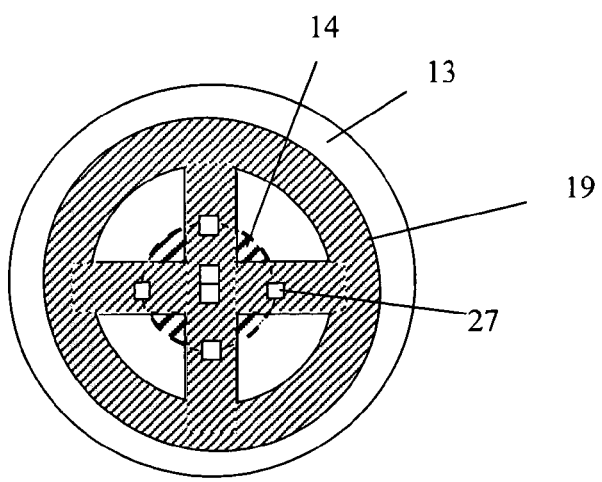

The disc 19 may have a variety of shapes. In one embodiment, shown in FIG. 4a, the disc is present in the form of a substantially flat circular disc. In another embodiment, shown in FIG. 4b, the disc 19 is in the form of a substantially flat annular ring interconnected by a single cross bridge. In yet another embodiment, the shown in FIG. 4c the disc 19 is present in the shape of a substantially flat annular ring interconnected by multiple cross bridges.

The disc 19 serves as a substrate on which a ceramic material layer and piezoelectric elements are to be formed. Additionally, prior to the formation or application of such materials onto the disc, the disc surface may optionally but preferably be washed, roughened, and/or oxidized using conventional methods. It is an important feature of this invention that the ceramic material layer and/or the piezoelectric elements are formed onto the upper surface 21 of the disc 19 prior to bonding the disc to the diaphragm assembly 13, as described below.

A ceramic material layer 25 is formed on the upper surface of the disc 19 as shown in FIGS. 1 and 2. The ceramic material layer 25 serves as an insulator. Any suitable known ceramic material may be used for the ceramic material layer 25. Examples of suitable ceramic materials nonexclusively include silica, alumina, zirconia, glass, and combinations thereof. Additional materials include crystallizable glass, filled glass, and the like. The thickness of ceramic material layer 25 on the disc 19 may be determined by those skilled in the art. Preferably, the ceramic material layer 25 has a thickness ranging from about 0.025 mm to about 0.1 mm, preferably from about 0.025 mm to about 0.075 mm, and most preferably from about 0.040 mm to about 0.060 mm.

The ceramic material layer 25 may be formed on the disc 19 using a variety of conventional methods. In certain embodiments of the invention, the ceramic material layer 25 is present in the form of a ceramic coating which has been coated onto the upper surface 21 of the disc 19 using conventional coating methods. In forming such ceramic coatings, a commercial ceramic dielectric paste may be screen printed on the disc 19, dried in an oven at a temperature of about 150° C., and fired at temperatures of about 850° C. to 950° C. to form such a ceramic coating. Several layers of ceramic paste can be dried independently and fired (co-fired) together in forming the ceramic coating. As few as one, or up to 8 or more ceramic paste layers may be applied in this way. Preferably the thickness of the ceramic coating after firing ranges from about 0.01 mm to about 0.2 mm microns in thickness, preferably from about 0.03 mm to about 0.09 mm in thickness, and most preferably from about 0.04 mm to about 0.06 mm in thickness.

As shown in FIG. 3, an additional ceramic material layer 25b may be present on the lower surface 23 of the disc 19. In an alternate embodiment, the ceramic material layer 25 is present in the form of a ceramic substrate which has been attached onto the upper surface 21 of the disc 19 using conventional bonding methods. Such methods nonexclusively include glass bonding, gluing, soldering, brazing and the like.

Next, the invention includes a plurality of piezoresistive elements 27 on the ceramic material layer 25 on the upper surface 21 of the disc 19. In this invention, the piezoresistive elements 27 serve to translate pressure into electrical signals. It is preferred that at least a portion of the piezoresistive elements are present at a location above the diaphragm 14.

Such piezoresistive elements 27 are well known in the art, and are commercially available. They often comprise a composite of ruthenium oxide in a glass matrix. Such piezoresistive elements 27 are preferably formed on the ceramic material layer 25 to form a Wheatstone bridge. The individual piezoresistive elements 27 can vary in size as determined by those skilled in the art. Generally, these elements range in size from about 0.5 mm×0.5 mm to about 2.5 mm×2.5 mm.

The piezoresistive elements 27 may further be electrically connected to a signal detection circuitry, such as an Application Specific Integrated Circuit (ASIC).

In attaching the sensing component 5 of the present invention with the base component 3, the lower surface 23 of the disc 19 is bonded onto the upper surface 15 of the diaphragm assembly 13 via a bonding material layer 29. It is preferred that at least a portion of the disc 19 is attached onto a surface of the diaphragm 14. While it is known in the art to bond individual components onto a diaphragm assembly via a bead of bonding material, it is preferred according to this invention that the bonding material be present as a substantially uniform thickness layer between the surfaces of the diaphragm assembly 13 and the disc 19. That is, the upper surface 15 of the diaphragm assembly 13 and the lower surface 23 of the disc 19 are directly bonded via such a bonding material layer 29 having substantially uniform thickness.

Bonding may be conducted using any conventionally known method such as by melt bonding, gluing, soldering, brazing, and the like. Suitable bonding materials nonexclusively include organic adhesives such as structural epoxies, perform epoxy films, epoxy paste; glass materials such as glass performs, glass paste; ceramics; metal materials such as metal solder or braze, or combinations thereof. In one preferred embodiment the bonding material comprises an epoxy adhesive. In another preferred embodiment the bonding material comprises a metal solder or braze.

Bonding temperature and processes depend on the bonding materials used. Epoxies normally cure at room temperature to about 200° C., solders melt at about 180° C. and higher, preferred glass pastes or performs melt at temperatures ranging from about 500° C. to about 700° C.

It is most preferred that the diaphragm assembly 13 and pressure port 7 are not exposed to high temperature processing. That is, it is preferred that the diaphragm assembly 13 and pressure port 7 are not subjected to temperatures above about 700° C. during the fabrication of the inventive pressure sensing apparatus 1. Eliminating the need for high cost heat-sensitive materials for the diaphragm assembly and/or pressure port results in a great cost savings. Accordingly, it is preferred that any high-heat steps (above about 700° C.) such as steps required to form the ceramic material layer 25 on the disc 19, are conducted prior to attaching the disc 19 to the diaphragm assembly 13. In one preferred embodiment, the pressure sensing apparatus is assembled as two separate units, wherein a base component 3 and a sensing component 5 are separately formed and thereafter attached by bonding the disc 19 of the sensing component 5 to the diaphragm assembly 13 of the base component 3, via a layer of bonding material 29.

The pressure sensing apparatus 1 of the present invention may be used in a variety of applications, and are particularly well suited for very high pressure environments. The apparatus 1 is also useful in medium or low pressure environments as well. For example, the inventive pressure sensing apparatus 1 may be useful at pressures ranging from as low as 50 psi to about 20,000 psi or above, depending on diaphragm design and diaphragm assembly design. The inventive apparatus may also be used at a variety of temperatures, such as within the range of from about −40° C. to about 150° C.

The pressure sensing apparatus 1 of the present invention provides several advantages over the prior art. The inventive apparatus can be produced at a lower cost due to the requiring of less material, the use of less expensive materials, less reject cost, and less expensive fabrication cost due to a simpler fabrication process. Furthermore, multiple sensors can be fabricated on a single substrate, significantly reducing labor costs and processing time. The inventive pressure sensing apparatus further exhibits greater adhesion, greater thermal stability, and higher reliability due to a match of thermal expansion between the diaphragm assembly 13 and the disc 19.

The following non-limiting examples serve to illustrate the invention. It will be appreciated that variations in proportions and alternatives in elements of the components of the invention will be apparent to those skilled in the art and are within the scope of the present invention.

EXAMPLE 1

A circular, flat disc of 430 stainless steel is machined to have a diameter of 0.5 mm and a thickness of 0.1 mm, and is washed in detergent. A ceramic dielectric paste comprising alumina is screen printed onto an upper surface of the disc. The ceramic paste is dried on the disc in an oven for 10-15 minutes at 150° C. The dried paste is then fired on the disc for 60-90 minutes at 850-950° C. to form a ceramic coating having a thickness of about 0.05 mm. Piezoresistive elements are then formed on the ceramic coating by first screen printing a conductive gold paste onto the ceramic coating. The conductive paste is then dried on the ceramic coating in an oven for 10-15 minutes at 150° C. The conductive paste is then fired on the ceramic coating for 60-90 minutes at 850° C. to form a conductive layer having a thickness of about 0.01 mm. A resistor paste is then screen printed onto the conductive layer. The resistor paste is then dried on the conductive layer in an oven for 10-15 minutes at 150° C. The resistor paste is then fired on the conductive layer for 60-90 minutes at 850° C. to form a resistor layer having at thickness of about 0.02 mm.

Separately, a 17-4PH pressure port is welded to a 17-4PH stainless steel diaphragm assembly. The diaphragm assembly includes a central diaphragm having a diameter of 0.6 mm and a thickness of 0.1 mm. A lower surface of the metal disc above is bonded to an upper surface of the diaphragm assembly using an epoxy paste bonding material.

EXAMPLE 2

A circular, flat ceramic disc comprising alumina is formed, having a diameter of 0.5 mm and a thickness of 0.1 mm, and is washed in detergent. Piezoresistive elements are then formed on the ceramic coating by first screen printing a conductive gold paste onto the ceramic coating. The conductive paste is then dried on the ceramic coating in an oven for 10-15 minutes at 150° C. The conductive paste is then fired on the ceramic coating for 60-90 minutes at 850° C. to form a conductive layer having a thickness of about 10 microns. A resistor paste is then screen printed onto the conductive layer. The resistor paste is then dried on the conductive layer in an oven for 10-15 minutes at 150° C. The resistor paste is then fired on the conductive layer for 60-90 minutes at 850° C. to form a resistor layer having at thickness of about 0.02 mm.

Separately, a 316 stainless steel pressure port is welded to a 316 stainless steel diaphragm assembly. The diaphragm assembly includes a central diaphragm having a diameter of 0.6 mm and a thickness of 0.1 mm. A lower surface of the ceramic disc above is bonded to an upper surface of the diaphragm assembly using an epoxy paste bonding material.

EXAMPLE 3

Example 1 is repeated except that after firing the resistor paste, an overglaze glass sealant paste is screen printed onto the resistor layer and dried in an oven for 10-15 minutes at 150° C. The overglaze glass sealant paste is then fired for 30-60 minutes at 500-700° C. to form an overglaze glass sealant layer having a thickness of 0.01-0.02 mm.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above, and all equivalents thereto.

What is claimed is:

1. A pressure sensing apparatus which comprises:
    a) a pressure port having an upper surface and a base portion;
    b) an elastically deformable pressure-sensitive diaphragm assembly having upper and lower surfaces and a central pressure-sensitive diaphragm; the lower surface of the diaphragm assembly being attached onto the upper surface of the pressure port;
    c) a substantially planar disc having upper and lower surfaces; the lower surface of the disc being bonded to the upper surface of the diaphragm assembly via a layer of a bonding material;
    d) a ceramic material layer on the upper surface of the disc; and
    e) a plurality of piezoresistive elements on the ceramic material layer.

2. The apparatus of claim 1 further comprising signal detection circuitry electrically connected to the plurality of piezoresistive elements.

3. The apparatus of claim 1 wherein the disc comprises metal.

4. The apparatus of claim 3 wherein the disc comprises stainless steel, nickel, aluminum, or combinations and/or alloys thereof.

5. The apparatus of claim 4 wherein the disc comprises an oxidation resistant aluminum alloy.

6. The apparatus of claim 1 wherein the disc comprises a ceramic material.

7. The apparatus of claim 6 wherein the disc comprises alumina, zirconia, silica, or combinations thereof.

8. The apparatus of claim 1 wherein the disc has a thickness ranging from about 0.025 mm to about 1.5 mm.

9. The apparatus of claim 1 wherein the disc has a diameter ranging from about 0.3 mm to about 30 mm.

10. The apparatus of claim 1 wherein the diaphragm assembly comprises stainless steel, nickel, aluminum, or combinations and/or alloys thereof.

11. The apparatus of claim 1 wherein the diaphragm has a thickness ranging from about 0.125 mm to about 4.5 mm.

12. The apparatus of claim 1 wherein the diaphragm has a diameter ranging from about 0.3 mm to about 30 mm.

13. The apparatus of claim 1 which further comprises a ceramic material layer on the lower surface of the disc.

14. The apparatus of claim 1 wherein the ceramic material layer comprises a ceramic coating which has been coated onto the disc.

15. The apparatus of claim 1 wherein the ceramic material layer comprises alumina, zirconia, silica, glass, or combinations thereof.

16. The apparatus of claim 1 wherein the ceramic material layer comprises crystallizable glass or filled glass.

17. The apparatus of claim 1 wherein the bonding material comprises an organic adhesive, glass, ceramic, metal, or combinations thereof.

18. The apparatus of claim 1 wherein the bonding material comprises an epoxy adhesive.

19. The apparatus of claim 1 wherein the bonding material comprises a metal solder or braze.

20. A method for forming a pressure sensing apparatus which comprises:
    a) providing a substantially planar disc having upper and lower surfaces;
    b) forming a ceramic material layer on the upper surface of the disc;
    c) forming a plurality of piezoresistive elements on the ceramic material layer;
    d) providing a pressure port having an upper surface and a base portion;
    e) attaching a deformable pressure-sensitive diaphragm assembly, having upper and lower surfaces and a central pressure-sensitive diaphragm, onto the pressure port such that the lower surface of the diaphragm assembly is attached onto the upper surface of the pressure port; and
    f) bonding the lower surface of the disc to the upper surface of the diaphragm assembly.

21. The method of claim 20 wherein steps (a)-(f) are conducted sequentially.

22. The method of claim 20 wherein the pressure sensing apparatus further comprises electrically connecting signal detection circuitry to the plurality of piezoresistive elements.

23. The method of claim 20 wherein the ceramic material layer comprises a ceramic coating which has been coated onto the disc.

24. The method of claim 20 wherein the bonding of the diaphragm assembly to the disc is conducted at a temperature of about 700° C. or less.

25. The method of claim 20 wherein the disc comprises stainless steel, nickel, aluminum, or combinations and/or alloys thereof.

26. The method of claim 20 wherein the disc comprises alumina, zirconia, or combinations thereof.

27. The method of claim 20 wherein the ceramic material layer comprises alumina, zirconia, silica glass, or combinations thereof.

28. A method for sensing pressure, which comprises:
    I) providing a pressure sensing apparatus comprising:
        a) a pressure port having an upper surface and a base portion;

b) an elastically deformable pressure-sensitive diaphragm assembly having upper and lower surfaces and a central pressure-sensitive diaphragm; the lower surface of the diaphragm assembly being attached onto the upper surface of the pressure port;
c) a substantially planar disc having upper and lower surfaces; the lower surface of the disc being bonded to the upper surface of the diaphragm assembly via a layer of a bonding material;
d) a ceramic material layer on the upper surface of the disc; and
e) a plurality of piezoresistive elements on the ceramic material layer;

II) placing the pressure sensing apparatus into a pressurized environment, thereby causing the diaphragm to deform in response to changes in pressure;
III) detecting any changes in pressure of the pressurized environment via the piezoresistive elements; and
IV) analyzing the pressure of the pressurized environment by observing changes in the piezoresistive elements.

* * * * *